United States Patent [19]

Cordiano

[11] Patent Number: 4,570,737
[45] Date of Patent: Feb. 18, 1986

[54] POWER-ASSISTED RACK-AND-PINION STEERING APPARATUS

[75] Inventor: Ettore Cordiano, Turin, Italy

[73] Assignee: Corint s.r.l., Turin, Italy

[21] Appl. No.: 587,768

[22] Filed: Mar. 9, 1984

[30] Foreign Application Priority Data

Mar. 9, 1983 [IT] Italy ............................... 67269 A/83
Dec. 23, 1983 [IT] Italy ............................... 68351 A/83

[51] Int. Cl.⁴ .......................... B67D 5/06; F16K 31/12
[52] U.S. Cl. ........................................ 180/148; 251/57
[58] Field of Search ............... 180/141, 147, 148, 149; 251/57

[56] References Cited

U.S. PATENT DOCUMENTS 4,320,778  3/1982  Baumann ............................... 251/87
4,354,422 10/1982  Nishikawa et al. ................. 180/148
4,487,281 12/1984  Cordiano ............................. 180/148

Primary Examiner—John J. Camby
Attorney, Agent, or Firm—Sughrue, Mion, Zinn, Macpeak & Seas

[57] ABSTRACT

In a power-assisted rack-and-pinion steering apparatus, axial movements of a helical tooth pinion resulting from a torque being applied thereto cause corresponding displacements of the movable member of a control valve of the apparatus. A piston which moves axially together with pinion defines a sealed chamber of variable volume, which is filled with an incompressible fluid, such as oil or grease. The movable member of the control valve is slidably mounted along an axis different from the pinion axis and is operated by a push-rod having one end surface arranged so as to sense the pressure within the chamber of variable volume. Means are provided for holding the movable member of the control valve in its central neutral position in case the fluid contained within the chamber is lost.

7 Claims, 6 Drawing Figures

POWER-ASSISTED RACK-AND-PINION STEERING APPARATUS

The present invention relates to a power-assisted rack-and-pinion steering apparatus, of the known type comprising:
a casing,
a rack-engaging helical tooth pinion,
a shaft connected to said pinion,
a bearing rotatably supporting said shaft within a cylindrical cavity of the casing, said bearing being slidably mounted within said cylindrical cavity to allow axial displacements of the pinion,
a control valve having a movable member which is slidably mounted within an auxiliary cavity of the casing along an axis different from the pinion axis,
means for transforming an axial displacement of the pinion into a displacement of said movable member of the control valve, said means including
   a piston operatively connected to said bearing, with respect to axial displacements of the latter,
   a chamber of variable volume defined within said cylindrical cavity and facing said piston, said chamber being filled with a deformable and substantially incompressible material,
   a push-rod connected to said movable member and having one end surface arranged so as to sense the pressure within said chamber of variable volume.

An apparatus of the above type is disclosed in EP-A-O No. 078 879. In this known solution, a rubber element is located within the said chamber of variable volume, so that the rubber of this element acts as the said deformable and substantially incompressible material. When a torque is transmitted by the steering wheel to the rack-engaging pinion, the latter is caused to move axially, together with the associated bearing and piston, by the axial forces generated because of the inclination of its helical teeth. Depending upon such axial forces, pressure exerted by the rubber element onto the push-rod varies, which results in a corresponding variation of the position of the valve movable member. Springs acting onto the bearing and onto the valve control member keep the rubber element under pressure and the movable member in a central neutral position when the torque applied onto the pinion is zero.

Studies and tests conducted by applicant have shown that in the above known solution, the forces absorbed by the rubber element for changing its shape, and also the hysteresis of the apparatus may become quite high and prevent regular operation of the control valve.

The object of the present invention is to overcome the above-mentioned problem.

According to the present invention there is provided a power-assisted rack-and-pinion steering apparatus of the above-mentioned known type, characterized in that said deformable and substantially incompressible material is a fluid, said apparatus further including sealing means for sealing said chamber of variable volume from the remaining part of said cylindrical cavity and from said auxiliary cavity. The fluid is preferably oil or grease.

In the apparatus according to the invention, the above-mentioned drawback of the prior known solution, namely the resistance opposed by the rubber element to change its shape and uniformly transmit the pressure, is completely eliminated, while the hysteresis of the apparatus is also reduced.

Further features and advantages of the present invention will become apparent from the following description, with reference to the annexed drawings, in which.

Figure 1:
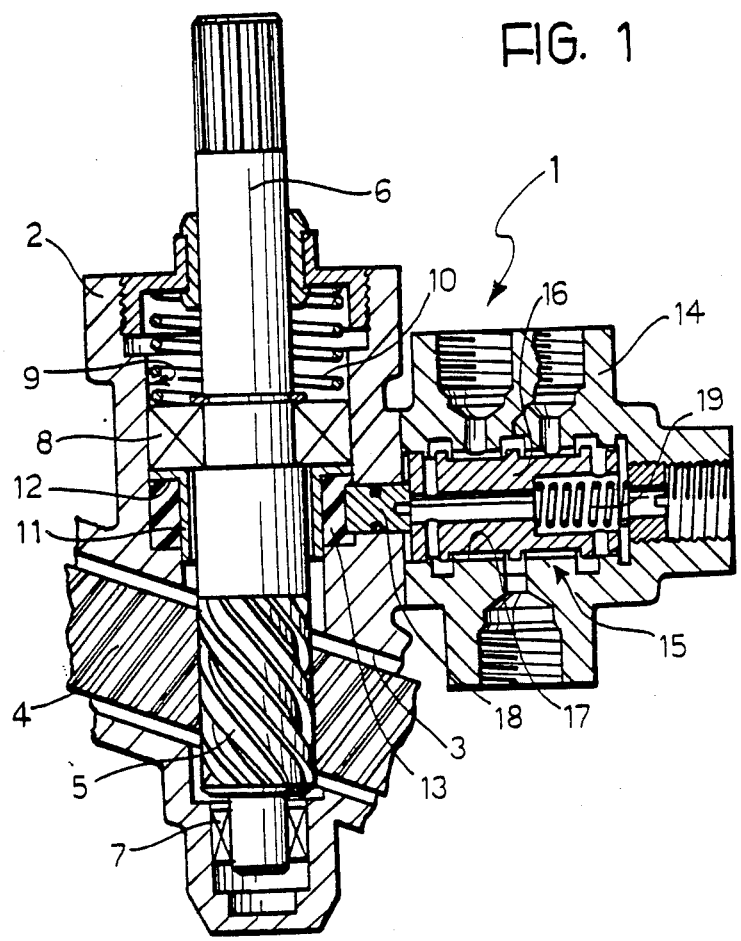
FIG. 1 is a cross-sectional view of a power-assisted rack-and-pinion steering apparatus according to the prior art, which is known from EP-A-O No. 078 879.

Referring to FIG. 1, there is shown a power-assisted rack-and-pinion steering apparatus 1 including a steering gear casing 2 having a passage 3 for a steering rack 4. A rack-engaging helical tooth pinion 5 forms part of a shaft 6 which is driven by the steering wheel via a known transmission (not illustrated). Shaft 6 is rotatably mounted within the casing 2 by means of bearings 7, 8 which both allow axial displacements of the pinion 5 relative to the casing.

Bearing 8 is slidably mounted within a cylindrical cavity 9 of the casing 2 and is urged by a spring 10 against an annular piston 11 which is arranged around the shaft 6. Piston 11 and the wall of the cylindrical cavity 9 define an annular chamber 12 of variable volume, wherein a rubber annular element 13 is located.

A casing 14 is associated to the steering gear casing 2, the casing 14 forming the body of a control valve 15 of the power-assisted steering apparatus. Valve 15 includes a movable member 16 which is slidably mounted within an auxiliary cavity 17 having an axis orthogonal to the axis of the shaft 6. A push rod 18 is slidably mounted within casing 2 along the axis of the auxiliary cavity 17. Push-rod 18 is interposed between the annular rubber element 13 and the movable member 16, the latter being urged against push rod 18 by a spring 19. Spring 10 and spring 19 keep the annular rubber element 13 under pressure and hold the movable member 16 in a central neutral position (illustrated in FIG. 1) when no torque is applied onto the pinion 5. When a torque is applied to the latter, this is caused to move axially, because of its helical teeth. This results in a different pressure exerted by piston 11 onto the annular rubber element 13, which causes movement of the movable member 16 of the control valve from its central neutral position.

As mentioned above, such known solution has the drawback that a resistance is opposed by the annular rubber element 13 to change its shape and uniformly transmit the pressure, the hysteresis of the device being also quite high.

In FIGS. 2 through 6, the parts which are common to the apparatus shown in FIG. 1 are indicated by the same reference numerals.

Figure 2:
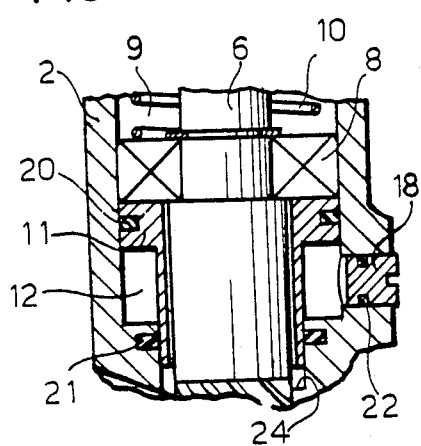
FIG. 2 shows a first embodiment of the apparatus according to the present invention.
Figure 4:
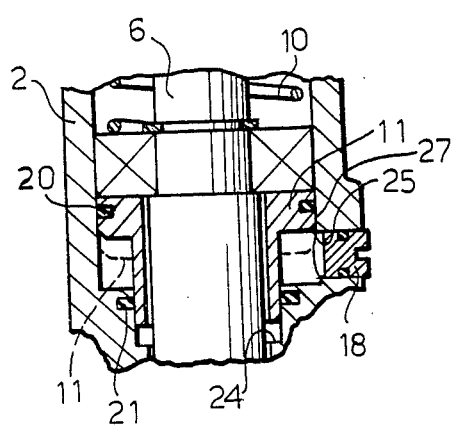
Figure 5:
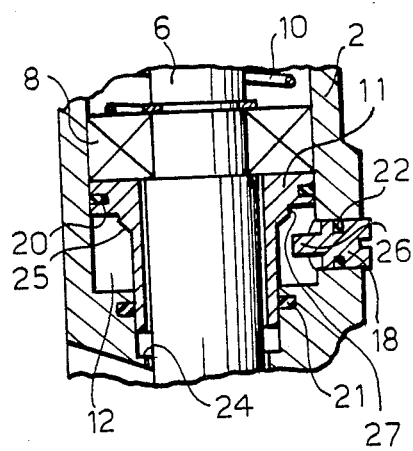

Referring to such figures, the main difference between the various embodiments illustrated therein and the prior art apparatus illustrated in FIG. 1 lies in that the annular rubber element 13 is eliminated and the chamber 12 is filled with a substantially incompressible fluid such as oil or grease. In FIGS. 2, 4 and 5, sealing rings 20, 21 and 22 are provided for isolating chamber 12 from the remaining part of the cylindrical cavity 9 and from the auxiliary cavity 17. The operation of the apparatus is identical to that of the apparatus of FIG. 1. When the torque applied to the pinion 5 is zero, the fluid pressure acting against piston 11 and push rod 18 is balanced by springs 10, 19 and the movable member 16 is held in its central neutral position. If a torque is applied to the pinion by the steering wheel, the pinion receives from rack 4, because of the inclination of its teeth, an axial thrust, so that the pressure within the chamber 12 varies. This results in a corresponding variation of the thrust of the fluid against the push-rod 18, which causes movement of the movable member 16 from its central neutral position.

Figure 3:
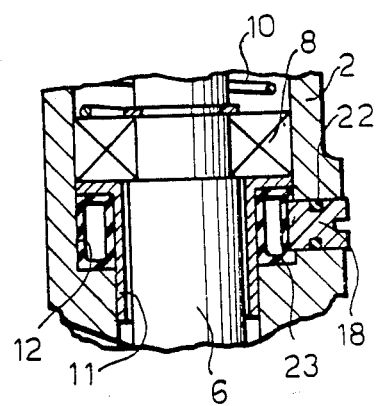
FIGS. 3 through 6 show four further embodiments of the invention.

FIG. 3 shows a different embodiment, wherein sealing rings 20, 21 are replaced by a deformable sealing hollow ring 23 located within chamber 12 and filled with oil or gease. Push rod 18 and piston 11 are in contact with the outer surface of the hollow sealing ring 23. By this solution, any possibility of leakage of fluid from chamber 12 is eliminated.

FIG. 4 shows an embodiment which is identical to that of FIG. 2 with the addition of means for preventing movement of the valve movable member 16 from its central neutral position in case of loss of the fluid contained within chamber 12.

Referring to FIG. 2, if the fluid within chamber 12 is lost, spring 10 will urge piston 11 to its end position in which the piston is in contact with a shoulder 24 defined on the wall of the cylindrical cavity 9. Under these conditions, spring 19 pushes the movable member 16 and push-rod 18 towards chamber 12 thus causing an undesired activation of the power-steering device. This irregular operation of the apparatus is prevented in the embodiment of FIG. 4, in which shoulder 24 is located in such a way that when the piston 11 is in contact therewith, its portion of greater diameter partially obstructs the hole of casing 2 wherein push-rod 18 is slidably mounted. Push rod 18 has such a length that, in its rest position (corresponding to the neutral position of movable member 16), its end surface facing chamber 12 is adjacent to such chamber but does not protude into the same. Thus, if fluid pressure fails, piston 11 reaches its end position against shoulder 24 (see dotted line in FIG. 4) preventing the push rod 18 from entering into chamber 12, thus holding movable member 16 in its central netural position. The portion of greater diameter of piston 11 has an outer circumferential chamber 25 on its surface within chamber 12 for forcing push-rod 18 outwardly from chamber 12 in case the end surface of push rod 18 protrudes within chamber 12 when the movable member 16 in its neutral position, which may be caused, for example, by manufacturing errors.

FIG. 5 shows a variant of FIG. 4, wherein the function of the outer surface of piston 11 is accomplished by a circumferential surface 27 intermediate between portions of greater and smaller diameter of the piston. Surface 27 cooperates with an axial shank 26 provided on the end surface of push-rod 18 in order to stop the latter out from chamber 12 when piston 11 is moved to its end position against shoulder 24. Chamber 25 has the same function as in FIG. 2.

Figure 6:
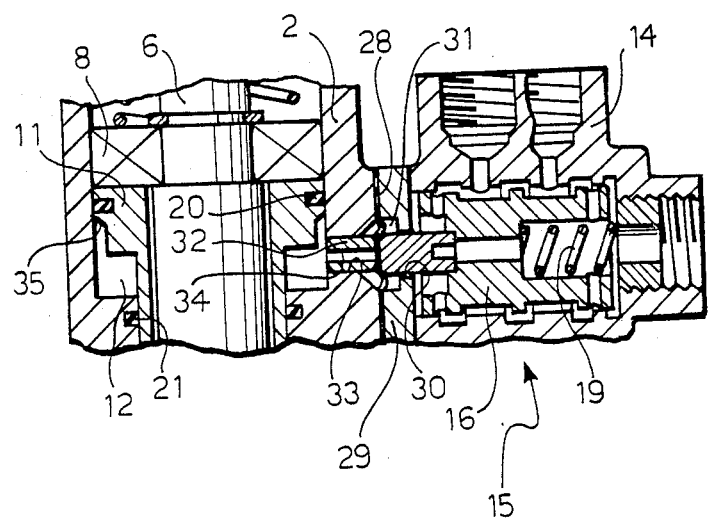

FIG. 6 of the annexed drawings shows a further embodiment wherein the sealing ring 22 is replaced by a resiliently deformable sealing diaphragm 28, whose outer periphery is clamped between the steering gear casing 2 and a fixed plate 29 which is interposed between casing 2 and the valve body 14. Plate 29 has a hole 30 wherein push rod 18 is slidably mounted. Hole 30 has an enlarged portion which defines a cylindrical cavity 31.

In its central portion diaphragm 28 has a curved portion defining an annular ridge coaxial with push rod 18. Such annular ridge defines a central seat on the diaphragm 28 for the push rod 18. The opposite surface of idaphragm 28 is in contact with an auxiliary plunger 32 which is slidably mounted within a hole 33 of casing 2. Plunger 32 has an end surface facing chamber 12 and is provided with an axial passage 34 through which the fluid flows when plunger 32 and diaphragm 28 move.

Operation of the apparatus of FIG. 6 is identical to that of the apparatus of FIG. 4. When the pressure whithin chamber 12 is varied, the push rod 18 and the central movable part of diaphragm 28 move axially at the same time, as a unit, acting as a piston slidable within a cylindrical cavity whose diameter is the mean of the diameters of the push rod 18 and cavity 31. The tapered circumferential portion 35 and the outer surface of piston 11 acts as a safety means for preventing undesired operation of the valve in case of loss of pressure within chamber 12, in the same way as in FIGS. 4 and 5.

In all the annexed figures the axis of the valve has been supposed orthogonal to end in the same plane of the axis of the pinion, but it is evident that their related positions can be quite different without changing the operation of the device, on condition that the pressure in chamber 12 can act against push-rod 18.

While the invention has been particularly shown and described with reference to some preferred embodiments thereof, it will be understood by those skilled in the art that various changes in form and details may be made therein without departing from the spirit and scope of the invention.

I claim:

1. A power assisted rack and pinion steering apparatus, comprising
   a casing,
   a rack engaging helical tooth pinion,
   a shaft connected to said pinion,
   a bearing rotatably supporting said shaft within a cylindrical cavity of the casing, said bearing being slidably mounted with said cylindrical cavity to allow axial displacements of the pinion,
   a control valve having a moveable member which is slidably mounted within an auxiliary cavity of the casing,
   means for transforming an axial displacement of the pinion into a displacement of said moveable member of the control valve, said means including
   a piston operatively connected to said bearing, with respect to axial displacements of the latter,
   a chamber of variable volume defined within said cylindrical cavity and facing said piston, said chamber being filled with a deformable and substantially incompressible material,
   a push rod operatively connected to said moveable member of the control valve, having one end surface arranged so as to sense the pressure within said chamber of variable volume,
   wherein said deformable and substantially incompressible material is a fluid, said apparatus further includes sealing means for isolating said chamber of variable volume from the remaining part of said cylindrical cavity and from said auxiliary cavity,
   and wherein said sealing means are comprised of a deformable hollow sealing element which is filled with the incompressible fluid and is located within said chamber of variable volume, with its outer surface in contract with the piston and the push rod.

2. A power assisted rack and pinion steering apparatus, comprising
   a casing,
   a rack engaging helical tooth pinion, a shaft connected to said pinion, a bearing rotatably supporting said shaft within a cylindrical cavity of the casing, said bearing being slidably mounted with said cylindrical cavity to allow axial displacements of the pinion, a control valve having a moveable member which is slidably mounted within an auxiliary cavity of the casing, means for transforming an axial displacement of the pinion into a displacement of said moveable member of the control valve, said means including a piston operatively connected to said bearing, with respect to axial displacements of the latter, a chamber of variable volume defined within said cylindrical cavity and facing said piston, said chamber being filled with a deformable and substantially incompressible material, a push rod operatively connected to said moveable member of the control valve, having one end surface arranged so as to sense the pressure within said chamber of variable volume, wherein said deformable and substantially incompressible material is a fluid, said apparatus further includes sealing means for isolating said chamber of variable volume from the remaining part of said cylindrical cavity and from said auxiliary cavity and means for holding the moveable member of the control valve in a central neutral position in case of loss of the fluid contained within said chamber.

3. A power assisted rack and pinion steering apparatus according to claim 2, wherein said piston hold the push rod in a position corresponding to the central neutral position of the moveable member, when the fluid within said chamber is lost and the piston goes to its end position.

4. A power assisted rack and pinion steering apparatus according to claim 3, wherein the piston is provided with a cam surface portion for urging the push rod outwardly from said chamber if, because of manufacturing errors, said push rod protrudes into said chamber in its neutral central position.

5. A power assisted rack and pinion steering apparatus, comprising a casing, a rack engaging helical tooth pinion, a shaft connected to said pinion, a bearing rotatably supporting said shaft within a cylindrical cavity of the casing, said bearing being slidably mounted with said cylindrical cavity to allow axial displacements of the pinion, a control valve having a moveable member which is slidably mounted within an auxiliary cavity of the casing, means for transforming an axial displacement of the pinion into a displacement of said moveable member of the control valve, said means including a piston operatively connected to said bearing, with respect to axial displacements of the latter, a chamber of variable volume defined within said cylindrical cavity and facing said piston, said chamber being filled with a deformable and substantially incompressible material, a push rod operatively connected to said moveable member of the control valve, having one end surface arranged so as to sense the pressure within said chamber of variable volume, wherein said deformable and substantially incompressible material is a fluid, said apparatus further includes sealing means for isolating said chamber of variable volume from the remaining part of said cylindrical cavity and from said auxiliary cavity, and wherein said sealing means include a resiliently deformable diaphragm having its outer periphery fixed to the casing and a central moveable portion having one face in contact with said push rod and the opposite face arranged so as to sense the pressure wtihin said chamber.

6. A power assisted rack and pinion steering apparatus according to claim 5, wherein an auxiliary axially moveable plunger is interposed between said diaphragm and said chamber, said plunger having at least one through passage through which the fluid flows from one to the other of the plunger faces during movement of the latter, the same plunger having the function of stopping the push rod in its neutral position by reacting against the outer surfaces of the piston in case of loss of the fluid.

7. A power assisted rack and pinion steering apparatus according to claim 6, wherein said piston has a cam surface portion adapted to cooperate with said auxiliary plunger to urge the same outwardly from said chamber if, because of manufacturing errors said plunger protrudes into said chamber in its central neutral position.

* * * * *